Oct. 23, 1956     I. WOLAR     2,767,954
LIGHTING FIXTURE HANGERS AND CANOPY SUPPORTS
Filed Feb. 19, 1953     2 Sheets-Sheet 1
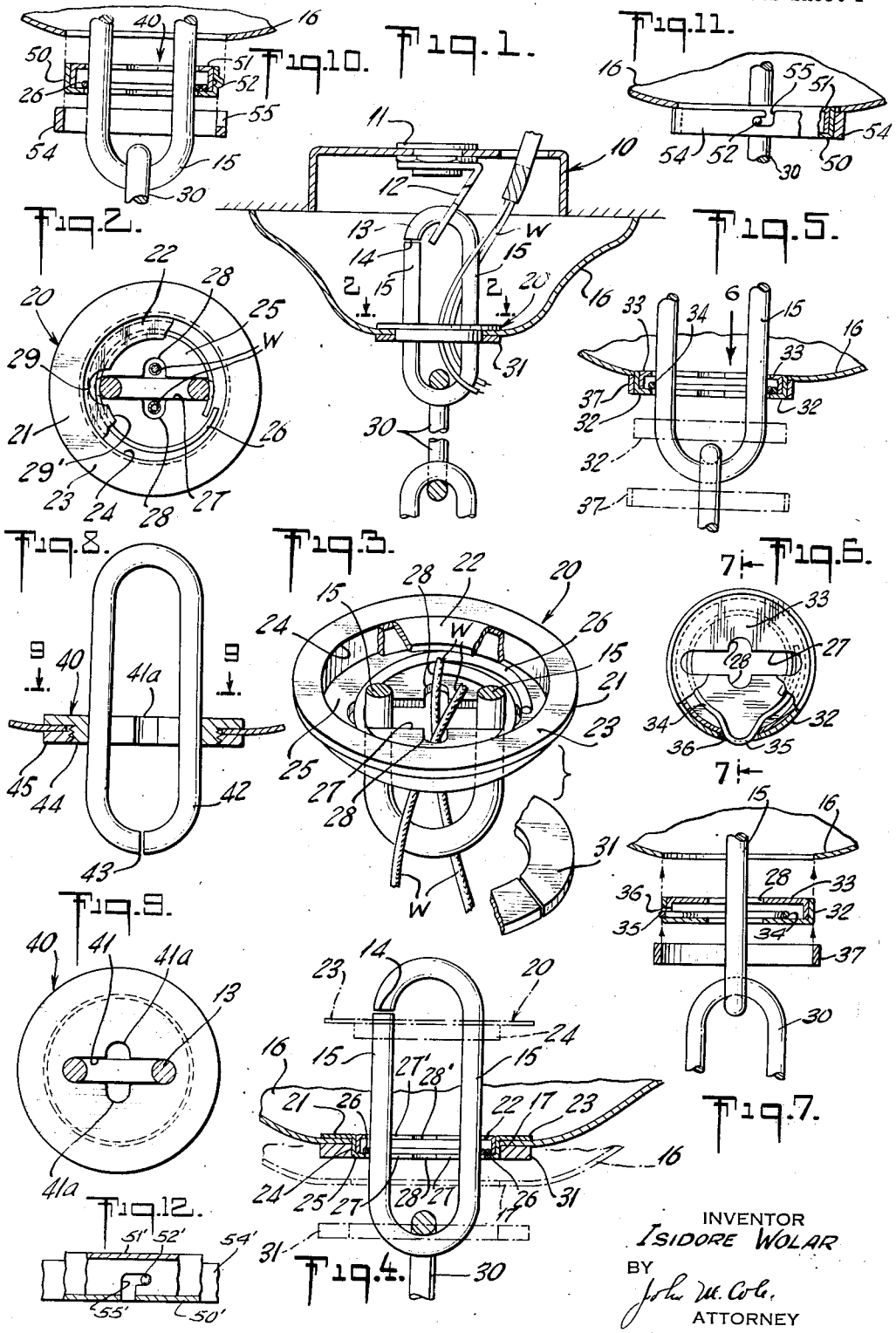
INVENTOR
ISIDORE WOLAR
BY
John M. Cole,
ATTORNEY Oct. 23, 1956　　　　　I. WOLAR　　　　　2,767,954
LIGHTING FIXTURE HANGERS AND CANOPY SUPPORTS
Filed Feb. 19, 1953　　　　　　　　　　　　　　2 Sheets-Sheet 2
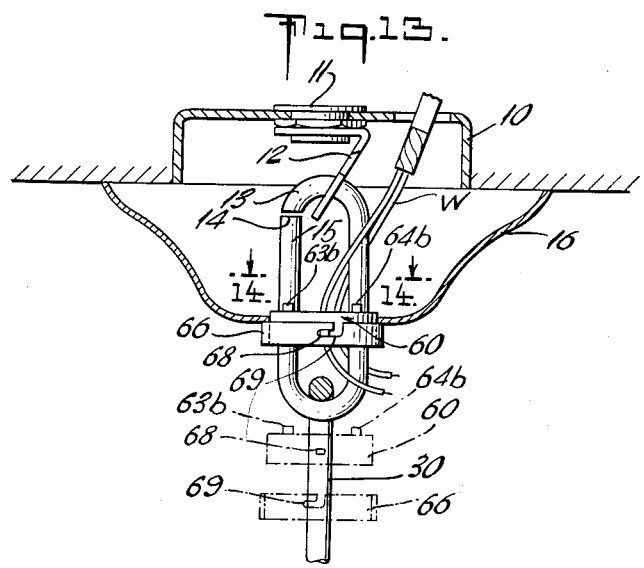
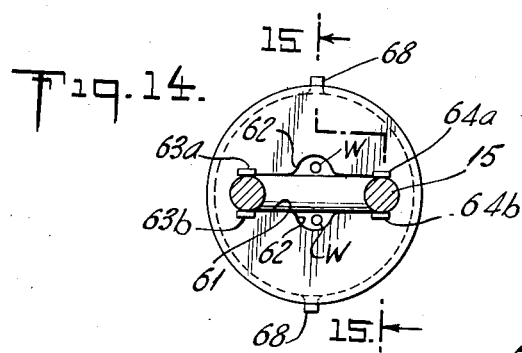
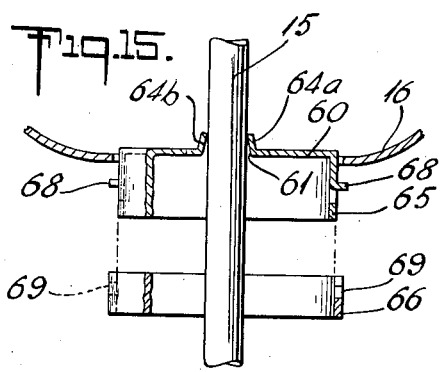
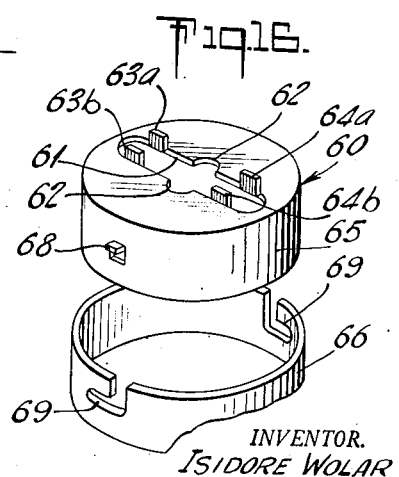
INVENTOR.
ISIDORE WOLAR
BY
John M. Cole
ATTORNEY United States Patent Office 2,767,954
Patented Oct. 23, 1956

2,767,954

LIGHTING FIXTURE HANGERS AND CANOPY SUPPORTS

Isidore Wolar, Mount Vernon, N. Y.

Application February 19, 1953, Serial No. 337,863

11 Claims. (Cl. 248—345)

The present invention relates to lighting fixture hangers and canopy supports.

In supporting a lighting fixture having a chain type hanger, it has been customary to provide a suitable hickey, a wire-receiving tube, a ring and other fittings to support the canopy and to provide a loop to receive the upper link of the chain. All these parts impose substantial cost in the manufacture and installation of the fixture. Stem type fixtures require other forms of relatively expensive parts and generally include a swivel.

The present invention contemplates chain hanger fixture supports wherein the chain itself or a chain link extends through the canopy and is supporetd directly from the outlet box by a hook or suitable fitting, the canopy is manually slidable along the fixture supply wires and the chain or stem, and is supported from the chain or chain link and when at the proper mounting height is held against undesired sliding movement by spring means of sufficient strength to grip the same and support the canopy.

The present invention contemplates the employment of fixture hangers of the chain or stem type having at or near the top a relatively long link with uniformly spaced sides, usually straight, hanging down from a hook or the like. This link receives a slotted slidable member which, due to the resiliency of one or the other of the relatively slidable parts effecting a gripping action, is retained in any position in which it is placed. The slot is of the right size to receive the link but too small in improper position to receive the next lower link of the chain so that the sliding member cannot pass into the link below the link along which it is designed to slide. The sliding member has a lower portion adapted to receive from below a fixture canopy and then a canopy retainer which, when raised, may be suitably secured to the sliding member to support the canopy.

The sliding member preferably carries a contractile spring which engages the sides of the link to provide friction sufficient to retain in position the sliding member and canopy. The frictional grip may also be brought about by utilizing the inherent resiliency of the chain link itself.

This application shows constructions for the same general purpose as those shown in my application, Serial No. 309,488, filed Sept. 13, 1952, but having certain advantages over the same which will be set forth below.

The accompanying drawings show, for purposes of illustrating the present invention, several embodiments in which the invention may take form, it being understood that the drawings are illustrative of the invention rather than limiting the same.

In the accompanying drawings:

Figure 1 is a view illustrating a lighting fixture chain and a canopy support in raised position, with the canopy and canopy supporting ring in section, the chain gripping element being in elevation;

Figure 2 is a section on line 2—2 of Figure 1 showing a chain gripping element employing a coiled spring;

Figure 3 is a perspective view showing the canopy support of Figure 2 taken from above and with parts broken away;

Figure 4 is an enlarged sectional view of the device of Figure 3 illustrating the canopy supported on the chain and showing in dot and dash lines the canopy and canopy supporting ring lowered;

Figure 5 illustrates a form of construction using a modified form of spring;

Figure 6 is a view taken in the direction of the arrow 6 of Figure 5, with parts omitted and parts broken away;

Figure 7 is a section on the line 7—7 of Figure 6;

Figure 8 is a view illustrating a modified form of construction utilizing the inherent resiliency of the link;

Figure 9 is a section on line 9—9 of Figure 8;

Figures 10 and 11 are views similar to Figures 7 and 5, respectively, showing another form of construction in which the ring is supported by a bayonet slot;

Figure 12 shows a further modification utilizing a bayonet slot;

Figure 13 is a view similar to Figure 1 illustrating a still further form of construction showing lock receiving unit with integral link gripping springs;

Figure 14 is a section on the line 14—14 of Figure 13;

Figure 15 is a section on the line 15—15 of Figure 14; and

Figure 16 is an exploded perspective view of the canopy support of Figures 13 and 15.

Figure 1 shows at 10 a conventional shallow outlet box having the usual outlet box stud 11 mounted in the ceiling. This outlet box stud carries a hickey or hook member 12 and a chain link 13. The link shown is of the straight-sided type with the gap or opening 14 in the side of the link. Any form of outlet box or hook may be used to support the chain link and this link is a long chain link of standard size.

The sides of the link are indicated at 15—15 and these are normally straight, parallel rod-like members, narrower than the opening in the canopy 16. Such an opening as indicated at 17, Figure 4, is normally 1 3/16 inches, while the outside dimension of the chain link is approximately 15/16 inch.

In the form of construction shown in Figures 1 to 4, the link 13 receives from above a sliding member designated generally by the reference character 20. In the form shown in these figures, this sliding member is made up of two sheet metal stampings 21 and 22. The stamping 21 has an outwardly extending flange 23 at the top, a downwardly extending side wall 24 and a bottom 25. A coiled wire spring 26 is received in the wall formed in the stamping 21 and this spring is held in place by the stamping 22 which is forced in place. The bottom 25 is provided with a slot 27 somewhat longer than the maximum width of the link from side to side of sufficient width to accommodate the link so that the stamping 21 can readily slide along the link. In addition, it is cut away as indicated at 28 to accommodate fixture wires. The stamping 22 has an opening 29 large enough to pass down along the outside of the link. It may be cut away as indicated to clear the wires.

The sliding member 20 just described can be removed from the free end of the link 13 past the wires but cannot pass down beyond this link because of the interference offered by the next lower link 30 of the chain. The spring 26 grips the sides of the link so that it stays in the position to which it is adjusted along the link 13.

The canopy 16 and a canopy retainer ring 31 are placed on the chain before the sliding member 20 and as these parts have round holes or openings larger in a diameter than the maximum width of the chain links, these elements may freely pass down along the chain and can be lifted up into position so that the canopy and retainer 31 are held in place as indicated in full lines in Figure 4 and in Figure 1. The retainer ring 31 may be in the form of a split ring as indicated in Figure 3 so that it can be held in place either by friction, or the parts may be threaded as in Figure 8.

In the form shown in Figures 5–7, the sliding member is made up of two stampings 32 and 33 which resemble the stampings 21 and 22 except that the outer stamping 32 has no flange, such as 25. The two stampings 23 and 33 are puched the same as 21 and 22, carry a spring 34 adapted to grip the chain link the same as the spring 26. This spring has a kink or bump 35 which projects through a hole 36 in stamping 32. The projection of the spring is such as to provide a frictional grip for the ring 37 sufficient to support the canopy.

In the form shown in Figures 8 and 9, the slidable member 40 is made of a single piece of relatively thick metal slotted as indicated at 41, 41a. This slot is of a proper length to tightly fit the outer faces of the straight sided link 42 so as to grip this link and slightly deform it. The link 42 normally has a gap 43 which is in the neighborhood of $1/32$ inch wide so that as the member 40 slides toward the end of the link having the gap or opening, the link is squeezed so as to set up frictional resistance to the movement of the sliding member along the link. This link can be reversed end for end on the chain so that the gap can be at the top or bottom.

The slider 40 has a reduced lower end 44 so as to have the same configuration as the bottom part of the slider 20, and a canopy supporting ring 45 may be employed the same as the ring 31. The parts 40 and 45 are here shown with cooperating threads to hold the ring 45 up. This ring may resemble the ordinary slip ring used as a supporting canopy.

In the form shown in Figures 10 and 11, the canopy 16 and chain links 15 and 30 are the same as before. The slidable member 49 is made up from two stampings 50 and 51, punched to accommodate the link and wires the same as stampings 21 and 22, or 32 and 33. The stamping 50 has a slight bump 52 which does not increase the size of the stamping beyond the diameter of the hole in the canopy. The two stampings hold the spring 26 as in Figures 3 and 4. The slider unit receives a canopy supporting ring 54 with a bayonet slot 55 in it. The slider remains in the upper link 15 as above described and the canopy and ring 54 may be on the lower part of the chain while the splicing is being done. The canopy may be moved up past the slider and the ring 54 secured as before. When the parts are in the position of Figure 11, the canopy is held up.

In the form shown in Figure 12, the pin 52' on the ring 54' enters bayonet slots 55' in the walls of stampings 50' and 51'.

In the construction shown in Figures 13–16, the canopy 16, link 13, outlet box 10, hook 12, lug 11 and wiring W are as above described. Here the chain receiving and gripping element are integral and in the form of an inverted, cup-shaped sheet metal stamping 60 with link receiving slot 61 and wiring openings 62 like those above described. Here pairs of prongs 63a, 63b and 64a, 64b are struck up out of the metal and so spaced as to bear against the link sides when the stamping 60 is received on the link. These permit the yieldable spring elements to grip the link. The slot length may, if desired, be dimensioned like the slot 41 (Figure 9) and additionally impose friction, resisting relative movement of the parts. The skirt 65 of the stamping receives a ring 66 similar to the rings 54, 54'. The ring 66 and the skirt 65 have cooperative bayonet slot elements 68 and 69.

In the arrangements above discussed, each sliding member can move only along the single link on which it is carried and cannot slide down past the lower links. With these constructions, the canopy and canopy supporting ring can move along the chain without bearing tightly against the chain and therefore the paint or lacquer on the chain is not scratched or worn. Furthermore, the wiring W may pass down through cutouts 28, 41a, 62 without contacting any surface which might injure the insulation. Should the installation be one in which the straight-sided link which cooperates with the slider is not long enough to reach sufficiently below the ceiling to accommodate the canopy, it is possible to place additional links of ordinary chain above the link 15 or 42, or suitable extensions or longer hooked members may be used instead of the one indicated.

Where the construction above discussed is to be used for stem fixtures, a hook fitting hangs from the bottom of the link instead of other chain links. The ring and canopy can pass down the stem.

Since it is obvious that the invention may be embodied in other forms and constructions within the scope of the claims, I wish it to be understood that the particular forms shown are but several of these forms, and various modifications and changes being possible, I do not otherwise limit myself in any way with respect thereto.

What is claimed is:

1. A lighting fixture suspension comprising an apertured canopy, a link chain with links disposed at right angles on one another and of a size to permit the canopy to move lengthwise therealong, an upper link of the chain extending through the bottom of the canopy and being an elongated, substantially rigid link with parallel sides, a chain gripping element disposed on said link and of a diameter to pass through the opening in the canopy and having a slot of restricted width to accommodate said elongated link and provide a wireway of restricted dimension, said slot preventing the said element from passing by the next lower link, the chain gripping element including means for bringing about a frictional grip with the said chain link to resist movement of the chain gripping element along said elongated chain link, and a canopy supporting ring below the canopy and having an opening to permit it to move along the chain and being detachably engaged with the chain gripping element to support the canopy, whereby, when the ring is released, the canopy and ring may move lengthwise of the chain while the chain gripping element is retained above the link next below the elongated link.

2. The combination of claim 1, wherein the frictional grip producing means is in the form of a spring carried by the chain gripping element and engages the sides of the elongated link along its length.

3. The combination of claim 2, wherein the spring is a coiled spring of a size to grip the sides of the elongated link along the length.

4. The combination of claim 1, wherein the chain gripping element is formed of two upper and lower relatively thin sheet metal parts and the frictional grip producing means includes a circular coiled spring between said sheet metal parts and of a size to grip the sides of the elongated link along its length.

5. The combination of claim 4, wherein the lower metal part has a hole in its side and the spring has a kink which protrudes through the hole and frictionally engages the ring.

6. A device for supporting a lighting fixture canopy having a predetermined sized opening from a lighting fixture chain of predetermined link size smaller than the opening so that the canopy may move along the entire chain, said device including a shallow, sheet metal chain link receiving unit having a peripheral portion of an outside diameter slightly less than the canopy opening and having a slot in the mid-portion thereof of a size to accommodate a link of the chain and fixture wiring but of restricted dimensions which prevent the acceptance of two adjacent links so that when placed on one link of the chain it cannot be passed onto the next link, the said chain link receiving unit having yieldable prongs alongside the link accommodating slot which frictionally grip the chain link, and a ring of larger outside diameter than the canopy opening receivable from below by the link receiving unit and detachably carried thereby to support the canopy.

7. The combination of claim 6, wherein the side portions of the gripping element and the ring have cooperative pin and bayonet slot elements to hold the ring in place.

8. A lighting fixture suspension comprising an apertured canopy, a link chain with links disposed at right angles to one another and of a size to permit the canopy to move lengthwise therealong, an upper link of the chain extending through the bottom of the canopy being an elongated link with substantially uniformly spaced sides, a chain gripping element disposed on said link and of a diameter to pass through the opening in the canopy and having a slot of restricted width to accommodate said elongated link and provide a wireway of restricted dimension, said slot preventing the said element from passing by the next lower link, the chain gripping element being slidable along the link and having friction producing members opposite one another and bearing against the link between the parts to resist movement of the chain gripping element along said elongated chain link, and a canopy supporting ring below the canopy and having an opening to permit it to move along the chain, the chain gripping element and canopy supporting ring having cooperative pin and bayonet slot elements to hold the ring in place, whereby the canopy and ring may move lengthwise of the chain while the chain gripping element is retained above the link next below the elongated link, and the ring may be separated from the chain gripping element so that the ring and canopy may be lowered along the chain.

9. A lighting fixture suspension comprising an apertured canopy, a link chain with links at right angles to one another and of a size to permit the canopy to move lengthwise therealong, an upper link of the chain extending through the bottom of the canopy being an elongated link with substantially uniformly spaced sides, a sheet metal chain gripping element disposed on said chain and of a diameter to pass through the opening in the canopy and having a slot of restricted width to accommodate said elongated link and provide a wireway of restricted dimension which prevents the said element from passing by the next lower link, and yieldable prongs along side the slot which bring about a frictional grip between the elongated chain link and the chain gripping elements to resist movement of the chain gripping element along said elongated chain link, and a canopy supporting ring below the canopy and having an opening to permit it to move along the chain and being detachably engageable with the chain gripping element to support the canopy, whereby the canopy and ring may move lengthwise of the chain while the chain gripping element is retained above the link next below the elongated link.

10. The combination of claim 9, wherein the chain gripping element is in the form of cup-shaped stamping, and wherein the side portions of the stamping and the ring have cooperative pin and bayonet slot elements to hold the ring in place.

11. A device for supporting a lighting fixture canopy having a predetermined sized opening from a lighting fixture chain of predetermined link size smaller than the opening so that the canopy may move along the entire chain, said device including a shallow chain link receiving unit having a peripheral portion of an outside diameter slightly less than the canopy opening and having a slot in the mid-portion thereof of a size to accommodate a link of the chain and fixture wiring but of restricted dimensions which prevent the acceptance of two adjacent links so that when placed on one link of the chain it cannot be passed onto the next link, means to frictionally grip the chain link received therein, and a ring of larger outside diameter than the canopy opening receivable from below by the link receiving unit, the ring and link receiving unit having cooperating pin and bayonet slot elements for detachably supporting the ring and canopy from the said unit and detachably carried thereby to support the canopy.

References Cited in the file of this patent

UNITED STATES PATENTS

| | | |
|---|---|---|
| 1,363,935 | Vette | Dec. 28, 1920 |
| 1,380,147 | Hoar | May 31, 1921 |
| 1,730,031 | D'Oliver, Jr. | Oct. 1, 1929 |
| 1,778,869 | Schockett | Oct. 21, 1930 |
| 1,845,079 | Ely, Jr. | Feb. 16, 1932 |
| 1,901,234 | Glowacki | Mar. 14, 1933 |
| 1,908,587 | D'Oliver, Jr. | May 9, 1933 |
| 2,309,143 | Sutherland | Jan. 26, 1943 |
| 2,355,353 | Wolfe | Aug. 8, 1944 |